A. SCHMITT.
AIR BLAST REGULATOR FOR THRESHING MACHINES.
APPLICATION FILED NOV. 6, 1913. RENEWED FEB. 18, 1916.
1,198,777.
Patented Sept. 19, 1916.
2 SHEETS—SHEET 1.
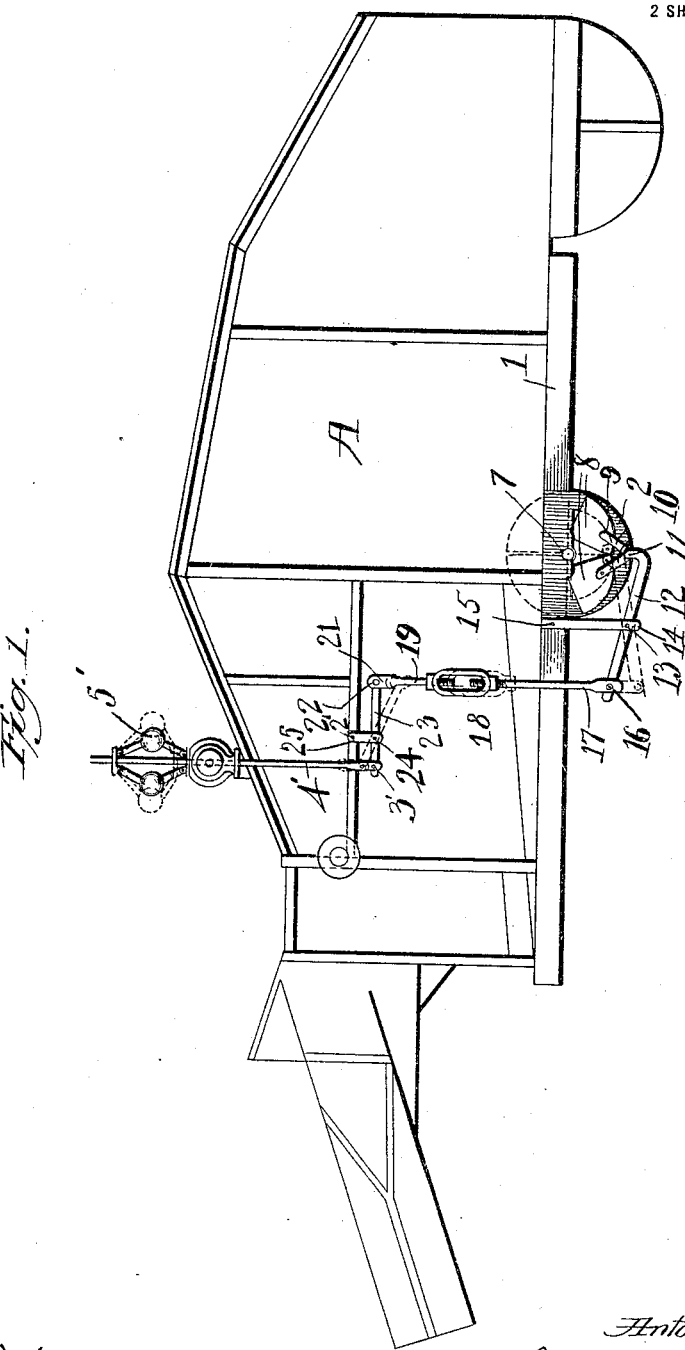
Witnesses
Inventor
Anton Schmitt
By George W. Sues.
Attorney

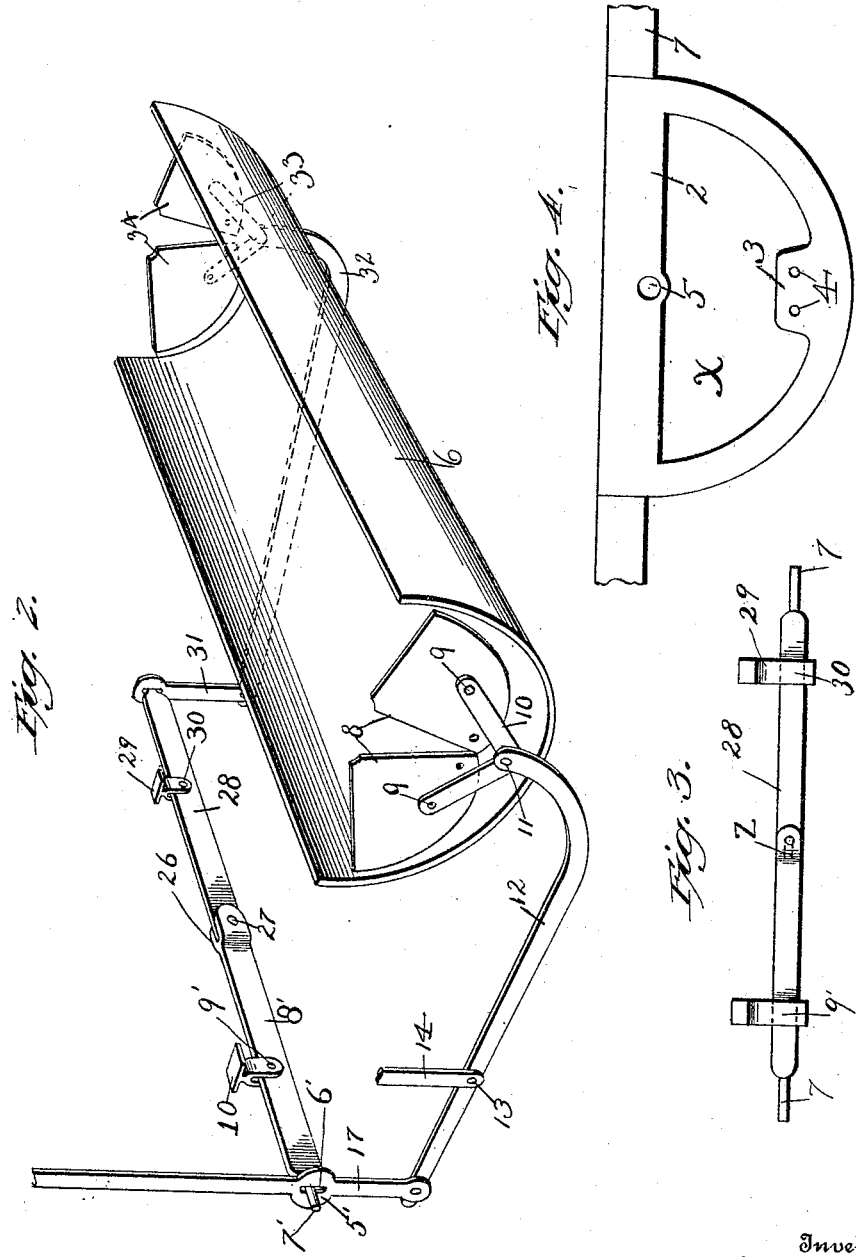

UNITED STATES PATENT OFFICE.

ANTON SCHMITT, OF DUBUQUE, IOWA.

AIR-BLAST REGULATOR FOR THRESHING-MACHINES.

1,198,777.  Specification of Letters Patent.  Patented Sept. 19, 1916.

Application filed November 6, 1913, Serial No. 799,521. Renewed February 18, 1916. Serial No. 79,212.

*To all whom it may concern:*

Be it known that I, ANTON SCHMITT, a citizen of the United States, and a resident of Dubuque, in the county of Dubuque and State of Iowa, have invented certain new and useful Improvements in Air-Blast Regulators for Threshing-Machines, of which the following is a specification, reference being had to the accompanying drawing.

This invention relates to certain new and useful improvements in air blast regulators, and the object of my invention is to provide a threshing machine, or any variety of fanning mills or winnowing machines, with an automatically operating mechanism, whereby the force of the air set in motion by the winnowing fan, is automatically regulated and controlled.

The further objects and advantages will be fully apparent from the following specification considered in connection with the accompanying drawings, in which—

Figure 1, shows a side elevational view disclosing a fragmentary portion of a threshing machine to which an air blast regulator embodying my invention is attached. Fig. 2, shows a perspective view with portions broken away of the lower part of the fan housing and the lever arrangement, of a modification in which two sets of fan blades are used. Fig. 3, shows a detached detail of the connecting levers used in the modification. Fig. 4, shows a detail of one of the end frames.

In my present invention I provide a fan box or housing for a threshing or similar machine, with two similar valve blades or shutters arranged in sets of two and located at one end of the fan housing. These fan blades are synchronously actuated in enlarging or decreasing the intake opening located at the end of the fan housing, so as to actuate and automatically regulate the supply of air to the blast or winnowing fan, and consequently control the force of the blast. The valve blades are used in sets of two or four, as may be desired. The valve blades which are pivotally secured are accurately counterbalanced by the mechanism connecting fan blades and the regulating governor shaft, so that the fan blades can be easily actuated.

In the accompanying drawing the numeral 1, designates the lower sill of a suitable threshing machine A to which sill is secured an end frame 2, shown in detail in Fig. 4. It is of course, understood that the threshing machine may be provided with such a frame 2, at the opposite end of the fan housing.

As shown in Fig. 4, each frame 2, has an access opening $x$, and is provided with an inwardly directed ear 3, having two pivots 4 located side by side. Above the ear 3, is provided a fan shaft bearing 5, within which is held the fan shaft 7, shown in Fig. 1.

Held upon the pivot pins 4, are the triangular valve blades 8, these blades being of such an area that when held together they close the intake opening $x$, but when fully open their movements are limited by the contacting of their opposed corners which are disposed a greater distance from the pivots of the valve blades, than the distance existing between each pair of pivots.

Each blade 8, has secured to it a pin 9, and depending upon each pin 9, is a pivotally held link 10, these links at their ends being secured to a pin 11, secured within the bent end of a J-shaped lever 12. This lever 12, as shown in Fig. 1, is supported upon a pin 13, secured to the hanger 14, this hanger being permitted a swinging movement, being secured at the upper end by means of a pivot 15, held to the sill 1, as clearly disclosed. At its end, the J-shaped lever 12, is provided with a pivot pin 16 arranged to engage the lower enlarged end of the screw stem 17, threaded into the turn buckle 18 which at its upper end gives support to the screw stem 19. The stem 19 has an enlarged head 21, carrying a pin 22, and this pin 22, in turn is secured to the end of the rock lever 23. As shown this rock lever 23 is secured intermediate of its ends to the pin 24, carried by the swinging bar 25, which by means of the pin 2', is secured to a suitable part of the threshing machine housing. At its remaining end the rock lever 23, has a pin 3' engaging the lower enlarged end of the operating shaft 4' which is actuated and forms part of the governor mechanism 5' as is usual in threshing machine construction.

In Fig. 2, I show a construction wherein the fan blades are located at each end of the fan housing. As shown in this modification the screw stem 17, is provided with an enlarged head 5'' having a slot 6' arranged to engage the projecting end 7' of the pivotally held lever 8', this lever by means of a pivot 9' being secured to a supporting ear 10. At its bifurcated end 26, this lever 8' carries the pin 27, which engages within the slotted end of the lever 28, pivotally held within the hanger 29, being supported upon the pin 30.

In Fig. 3 the slot within the lever 28 is shown in dotted lines at z. Secured to the end 7' of the lever 28 is a bar 31 secured to the end of a suitably supported J-shaped lever 32, giving support to the links 33, pivotally secured to the fan blades 34, and actuated and operated and supported in the same manner as are the blades 8 described.

Now, normally the blades 8 are held in a nicely balanced condition. As the speed of the governor shaft 4' increases it forces one end of the rock lever 23, downward to rock the same, the link 25 swinging to accommodate the movement of the rock bar 23. The end carrying the pin 22 of the rock lever 23, moves downward and shoves the counterbalancing turn buckle 18, and screw stems 17 and 19 downward to actuate the lever 12, which as explained is carried at the end of the swinging hanger 14, so that the farther the shaft goes downward the larger will be the opening X. When the levers 8' and 28 are employed the fan blades 34 are actuated as are the fan blades 8.

An air blast regulator constructed according to my invention is positive in operation and simple and inexpensive in construction.

Having thus described my said invention, what I claim as new and desire to secure by United States Letters Patent is:—

An air blast regulator for threshing machines, including in combination, a fan housing open at each end, pairs of valve blades pivotally secured adjacent each opening of said housing, the distance between the pivots of each pair of valve blades being less than the combined distance existing between the center of each pivot and the adjacent corner of each plate, and means for manipulating said valve blades upon said pivots.

In testimony whereof I affix my signature, in the presence of two witnesses.

ANTON SCHMITT.

Witnesses:
THEO SCHMITT,
CLARA WALZ.

Copies of this patent may be obtained for five cents each, by addressing the "Commissioner of Patents, Washington, D. C."